June 6, 1939.  D. B. DIMICK  2,161,701
SANDING MACHINE
Filed June 4, 1937  3 Sheets-Sheet 1
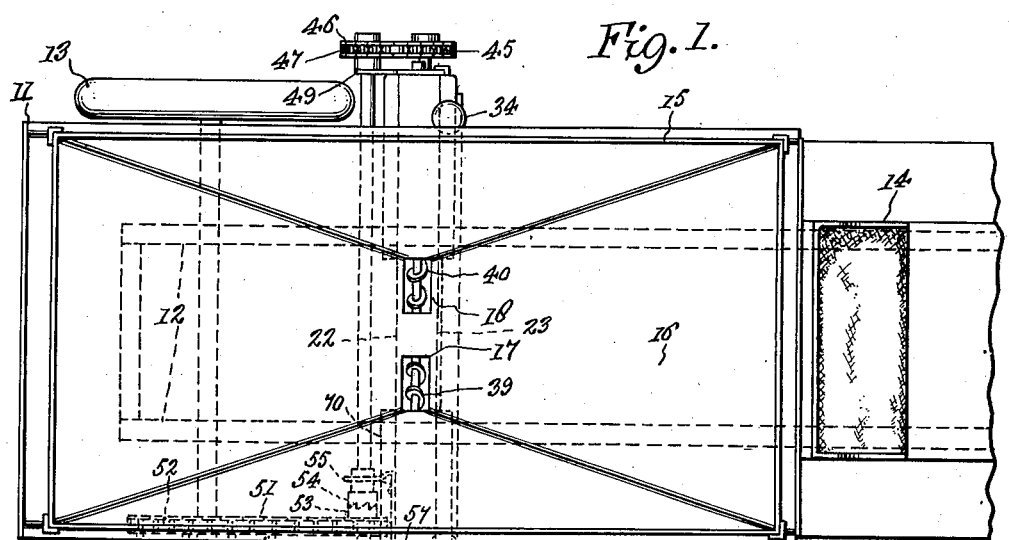
Fig. 1.
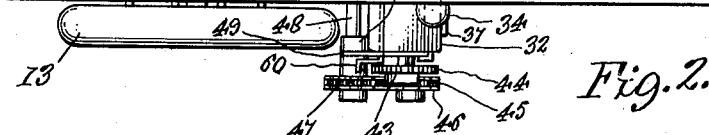
Fig. 2.
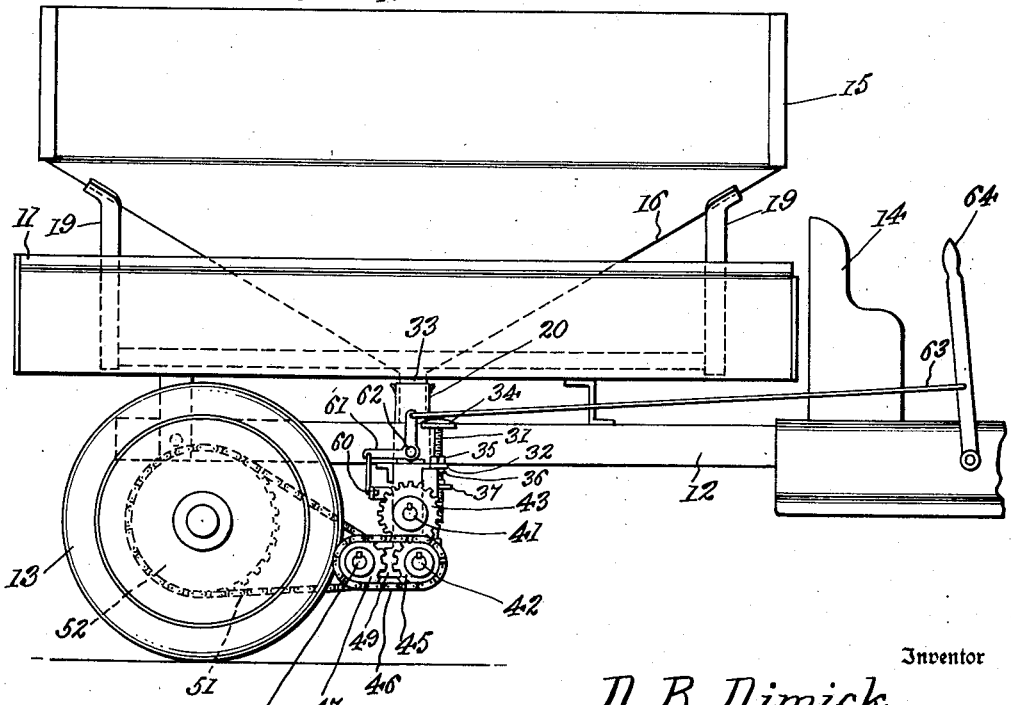
Inventor
D. B. Dimick
By Wilkinson & Mawhinney
Attorneys

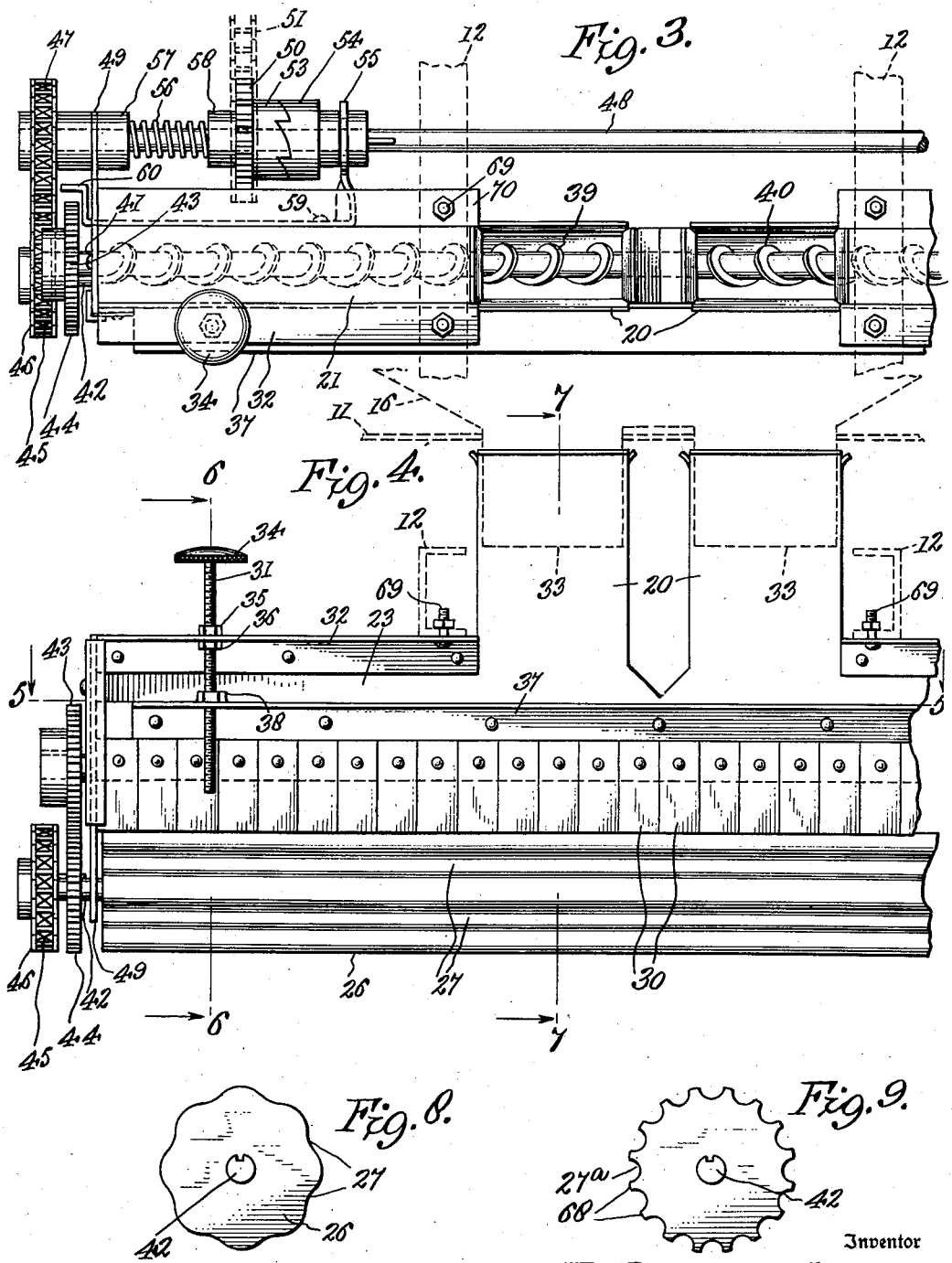

June 6, 1939.  D. B. DIMICK  2,161,701
SANDING MACHINE
Filed June 4, 1937  3 Sheets-Sheet 3
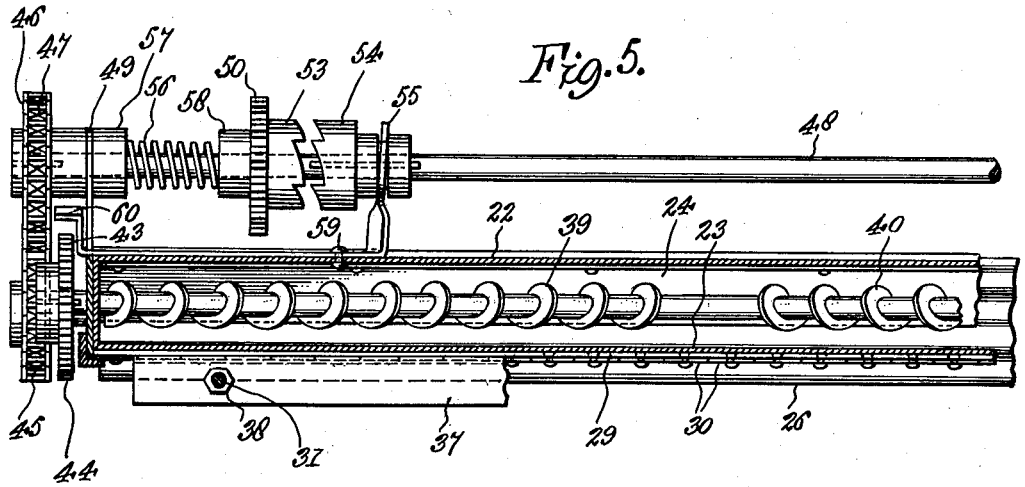
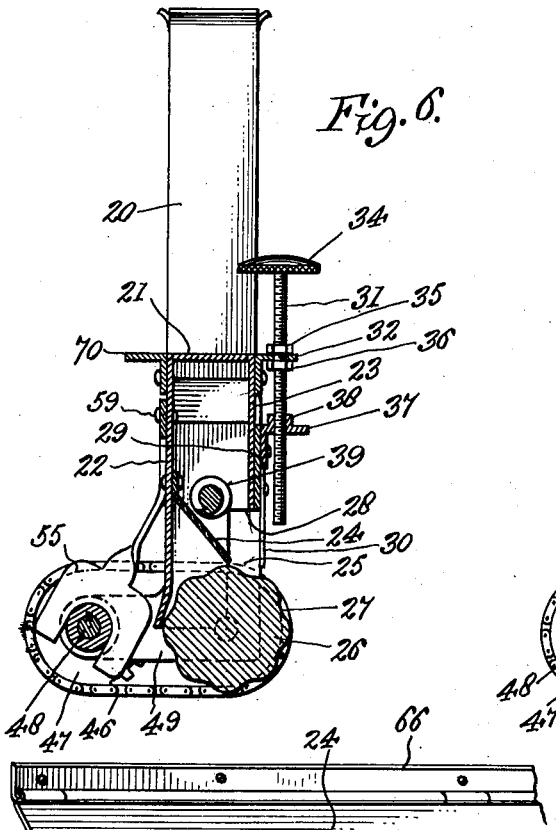
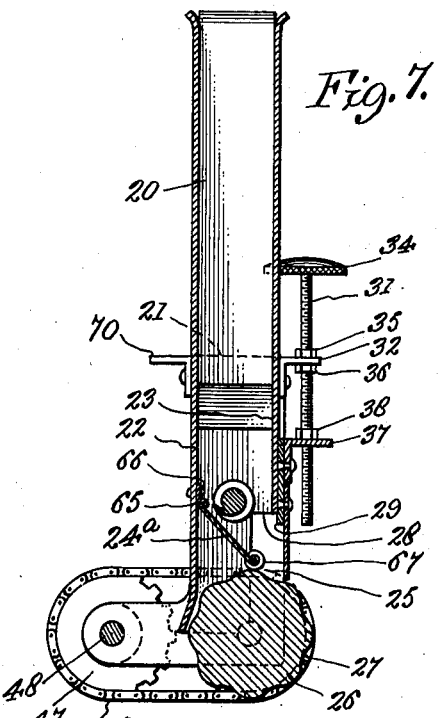
Inventor
D. B. Dimick
By Wilkinson & Mawhinney
Attorneys.

Patented June 6, 1939

2,161,701

UNITED STATES PATENT OFFICE 2,161,701

SANDING MACHINE

Daniel B. Dimick, Newton, Mass., assignor to Dimick-Mosher Products Company, Boston, Mass., a corporation of Massachusetts Application June 4, 1937, Serial No. 146,477

2 Claims. (Cl. 275—2)

The present invention relates to improvements in sanding machines and road covering machines, and has for an object to provide a machine for the application of sand to wet or icy roads or to snow covered roads for the purpose of preventing skidding of automobiles and other vehicles and, in the second instance, to provide for the sand treatment of bituminous, oiled or other pavements or roads.

The invention also contemplates the use of the improved device for the controlled and uniform distribution of loam or commercial fertilizer upon the putting greens and fairways of golf courses.

It is a further object of the invention to provide a device in the nature of an accessory for motor trucks, motor busses and other vehicles which shall be of a unitary character, applicable as a unit to the truck frame in a space forward of the rear wheels which is devoid of operating parts so as to readily receive the unit. This position is also desirable in order that the deposit of sand may take place in front of the rear wheels of the truck to enable such truck to proceed along the icy road in the act of laying down the anti-skid sheet of sand.

The invention has for a further object to provide an accessory bin or body upon the truck for ready installation whereby to convert the truck into a sanding machine having a relatively large capacity enabling the truck to extend its radius of activity for a great many miles without having to constantly resort to a base for replenishment of its sand supply.

The invention has for its further object the utilization of the standard motor truck for inexpensive conversion into a sanding machine in a short space of time.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a fragmentary top plan view of a motor truck equipped with a sanding device constructed according to the present invention.

Figure 2 is a side elevation of the same.

Figure 3 is a top plan view taken through a portion of the sanding unit on an enlarged scale.

Figure 4 is a front elevation of the same.

Figure 5 is a horizontal section taken on the line 5—5 in Figure 4.

Figure 6 is a vertical transverse section taken on the line 6—6 in Figure 4.

Figure 7 is a vertical transverse section taken on the line 7—7 also in Figure 4 and showing a slight modification.

Figure 8 is an end view of a distributor roll employed.

Figure 9 is a similar view of a modified form of distributing roll, and

Figure 10 is a fragmentary perspective view showing the hinged baffle.

Referring more particularly to the drawings, 11 designates generally the body of a motor truck, 12 the longitudinal channel beams thereof, 13 the rear wheels and 14 the cab.

Within the body is mounted a detachable bin 15 having a hopper bottom 16 inclining toward two discharge openings 17 which register with similar discharge openings 18 cut through the bottom or bed of the truck body 11.

The bin 15 may be placed loosely in the truck body 11 so that the same may be removed when the use of the truck for ordinary purposes is to be resumed. The bin 15 may be supported in the body 11 in any appropriate manner, but, due to its hopper bottom, the same will probably require a frame 19.

As shown more particularly in Figure 4, the discharge openings 17 and 18 are disposed above chutes 20. The hopper bottom 16 is provided with nozzles 33 extending down through the openings 17 and 18 and into the chutes 20 as shown in Figure 4. The purpose of the two chutes is to straddle the propeller shaft of the motor vehicle. The chutes 20 deliver the sand at a middle or intermediate point of a sand receptacle. This receptacle is closed at its upper part by a roof or top wall 21 except where the chutes 20 enter through such top wall. The receptacle also includes a rear wall 22 and a front wall 23. There is no bottom in the receptacle but a diagonal baffle plate 24 is supported by the back wall, as shown by Figure 6, and extends downwardly in a forward direction toward a base sand discharge opening 25. Below this discharge opening 25 is a distributing roll 26 having pockets 27 opening outwardly on its periphery. The peripheral part of the roll rotates in close proximity to the lower forward edge of the baffle plate 24 and the pockets 27 are successively presented to the discharge opening 25. The axis of the roll 26 is disposed rearwardly of the sand discharge opening 25. The rear wall 22 extends down below the baffle plate 24 and acts as a protection to the rear portion of the roll 26. Suitable clearance is provided between the roll and the lower ends of the rear wall 22 and baffle plate 24. The baffle plate 24 serves to keep the sand away from the V-shaped space between the upper portion of the roll 26 and the rear wall 22. If sand were allowed to get into this space, it would tend to fall by gravity and wedge itself between the roll and the lower part of rear wall 22, thus tending to jam the roll and frustrate its uniform rotation at constant speed which is desirable in order to spread the sand evenly upon the road surface. Moreover the material dealt with is of extreme hardness which would create a grinding action both upon the lower part of rear wall 22 and the surface of the roll 26; so much so that after a short while a large gap would be worn between these two parts through which the sand could leak away by gravity and destroy the uniform distribution aimed at by this invention, and also result in the waste of sand and the uneconomical operation of the machine.

The front wall 23 is cut-away at its lower portion to provide a front discharge opening 28 which communicates at its lower end with the base discharge opening 25. Movably mounted upon the front wall is a gate plate 29 carrying depending fingers 30. These fingers are comparatively narrow in width and of spring material, being welded, brazed, riveted or otherwise secured upon the gate 29 and depending at their lower edges into close proximity to the outer surface of the distributing roll 26. These fingers 30 are placed with their side edges in abutting relation so that together with the plate 29 they form a gate extending across the front discharge opening 28 and serving to prevent sand from escaping through this opening 28 when the lower edges of the fingers 30 are in their lowermost position just short of contact with the outer surface of roll 26. The gate is vertically adjustable as by means of the adjusting screws 31. The adjusting screws may be rotatably mounted in reinforcing strips 32.

Although any adjusting means may be employed for the purpose, in the instance shown the screw shafts 31 are manipulated by the knurled hand wheels 34, and while the same are rotatable in the brackets or strips 32, they are prevented from axial movement therethrough by reason of the facts that the shafts 31 do not have threaded engagement with the strips 32 and collars 35 and 36 affixed to the shafts 31 above and below the strips 32 check any such axial or vertical movement of the threaded shafts 31. The lower portions of the threaded shafts 31 threadedly engage through the flange 37 of the gate, such flange having preferably threaded bosses 38 thereon in order to increase the overall length through which the shafts 31 have threaded engagement. By rotating the hand wheels 34 the gate may thus be raised and lowered up and down upon the threaded shafts 31 and the port area of the discharge opening 28 may be accordingly enlarged or diminished. That is the distance from the outside surface of the distributing roll 26 to the lower edges of the fingers 30 may be changed.

By reason of the sand being brought into the receptacle centrally, and this commodity being exceedingly heavy and tending to fall down and pile up in the central portion of the receptacle, and further in order to insure an even and uniform feed of the sand all across the roadway as the machine moves along, I preferably provide some means within the receptacle for feeding the sand from the central entrance point in opposite directions toward the two ends of the receptacle. In the embodiment of the invention shown in the drawings this means consists of two worms or spiral conveyors 39 and 40, one of which is a right hand worm and the other a left hand worm whereby the two worms may be mounted upon a single shaft to be driven constantly and by common means for accomplishing the result of oppositely acting upon the centrally received sand and moving the same outwardly toward opposite ends of the receptacle. It will be understood that these conveyors are preferably of rather narrow diameter and that they are embedded in large cross sections of sand, but that they will feed the entire body along in the receptacle in accordance with well understood principles of screw conveying action.

Both the distributing roll 26 and these spiral conveyors 39 and 40 are to be driven, and to this end I provide a simple form of unit for driving both shafts from a common source. The shaft on which the conveyors 39 and 40 are both mounted is indicated at 41, and at 42 is represented the distributor shaft or the shaft for the distributing roll 26. The two shafts 41 and 42 are geared together for rotation in relatively opposite directions by the pinions 43 and 44.

On the distributor shaft 42 is a sprocket 45 driven by a chain 46 from a sprocket 47 on a jack shaft 48. This jack shaft is mounted in appropriate bearings 49 from the receptacle or from any other part. The jack shaft 48 is driven from the rear wheels of the motor vehicle by means of a sprocket 50, chain 51 and sprocket 52, which latter may be a two-part sprocket fitted over the rear axle or over the hub of the rear wheel 13 of the motor truck.

The sprocket 50 is loosely mounted on the jack shaft 48, as shown in Figures 3 and 4, and has a limited sliding movement along such shaft 48, the sprocket 50 having affixed thereto one member 53 of a ratchet clutch, of which the other member 54 is splined to the jack shaft 48, and having an axially sliding movement on the jack shaft 48 by a forked clutch shifting lever 55. A coil spring 56 is wound helically about the jack shaft 48 through a suitable number of convolutions with one of its ends abutting against a fixed part, such as the collar 57 and its other end abutting against the sleeve 58 of the sprocket 50. The lever 55 is pivoted or fulcrumed at 59 on the rear wall 22 of the receptacle and this lever may be operated by hand if desired by its operating end 60; or, as shown in Figure 2, such operating end may be coupled to one arm of a bell crank pivoted upon the receptacle as shown at 62 and having its other arm coupled to a rod 63 running to the cab 14 where a hand lever 64 is placed convenient to the hand of the driver of the vehicle for connecting and disconnecting the clutch in a manner hereinafter more particularly described.

Although the partition 24 may be rigid as shown in Figure 6, where its upper end is riveted or otherwise secured to the rear wall 22 of the receptacle, it is preferable to employ a movable baffle plate 24a as shown in Figure 7, such baffle plate being pivoted as at 65 to a plate 66 riveted or otherwise affixed to the rear wall 22 of the receptacle; while the lower edge of the baffle plate carries rollers 67 rolling upon the surface of the distributing roll 26 and adapted to move up and down with the undulating rotating surface of such roll.

Sand has a tendency to pack and such vibratory baffle 24a is beneficial in counteracting any such tendency on the part of the sand particularly in the discharge throat of the receptacle in and about the discharge openings 25 and 28 and in and about the lower edge of the gate.

The distributing roll 26 may have a peripheral contour of the undulating character as shown in Figure 8 with alternating troughs and crests, the troughs producing the pockets 27. This forms a convenient configuration for cooperation with the rollers 67 of the pivoted or vibratory type of baffle.

However, the external or peripheral contour of the roll may be of other forms, for instance as shown in Figure 9 such contour consists of deeper pockets 27ᵃ formed by thin ribs 68 between the pockets, the outer surfaces of such ribs being flattened off within the perimeter of the roll. In such case the pockets 27ᵃ have a greater capacity than the pockets 27.

As shown in Figure 3, bolts or other appropriate fastenings 69 serve to hold the receptacle upon the channel members 12 of the truck. Any other suitable fastening devices may be provided. These bolts may extend through the reinforcing strips 32 at the front and similar reinforcing strips 70 at the rear of the receptacle. These reinforcing strips are bolted, welded or otherwise affixed to the upper portions of the receptacle.

In operation, the entire device is a unit so that all that need be done is to pass the receptacle transversely beneath the truck frame at a point forwardly of the rear wheels thereof and to fix the same by the bolts 69 to the channel members 12 of the frame with the chutes 20 straddling the propeller shaft of the truck. The device is designed to fit this transverse under-truck space. Study of a great number of commercial vehicles upon the market of today reveals this space is unobstructed by any of the truck parts and that the placement of the sanding device in this locality will not interfere with any of the truck operations and will not require modification of any of the standard truck structure. Moreover, another consideration is involved in the utilizing of this unappropriated space for the sanding device, and that is that, when placed in this locality, the sanding device is in position to distribute the sand upon the road surface in advance of the rear traction wheels 13 of the truck, whereby such truck may be driven upon a previously unsanded road while taking advantage of its own sanding equipment.

As the truck is driven forward the chain 51, driven by the sprocket 50 upon the rear wheel, will drive the jack shaft 48 in a clock-wise direction, as viewed in Figure 2. This drive occurs by reason of the direct rotation of pinion 50 by chain 51, and the driving from this pinion 50 of the two members 53 and 54 of the ratchet clutch, these two members being maintained in toothed engagement by the coil spring 56. The clutch member 54, being splined to the jack shaft 48 will carry the jack shaft around therewith. When the truck bracks up, or goes into reverse gear, then it is not desirable to drive the device therewith for obvious reasons, one of which would require the reverse rotation of the conveyors 39 and 40 which would tend to draw the sand back to an initial central position where it could not very well be drawn on account of the heavy static pressure of the sand thereabove in the chutes and in the bin. However, when such truck backs up, the sprocket 50 and its associated ratchet clutch member 53 will be rotated in the direction of inclination of the ratchet teeth whereby such teeth will simply slip over one another and allow the member 53 to back away from the ratchet clutch member 54, this action being allowed by the compression of the coil spring 56. Therefore, this ratchet clutch will allow rotation of the jack shaft 48 in a forward movement only.

The clutch arrangement is also associated with another function of the device and that is to permit the operator through the handle lever in the cab 14 to disconnect the operation of the entire sanding device, irrespective of whether the truck is moving forwards or backwards. By shifting the lever 64, the bell crank lever 61 may be moved causing shifting movement of the lever 55, as indicated in Figure 5, whereby to slide the clutch member 54 along the spline of the jack shaft 58 away from the companion clutch member 53. The clutch member 53 may have a stop to arrest its movement in a right hand sliding direction under the expansive force of the spring 56, or the arrangement may be such that the clutch collar 54 may shift to the right, as shown in Figure 5, beyond the limit of the expansive action of said coil spring 56. In any event by this movement the clutch teeth are separated and no movement of the sprocket 50 can communicate rotation to the jack shaft 48.

When the clutch is engaged and the truck moving forward, sand will be distributed by the rotary action of conveyors 39 and 40 to all parts of the receptacle and this sand will fall down by gravity and be directed by the inclined baffle 24 toward the base discharge opening 25. Here the sand fills the pockets 27 of the roll 26 as it rotates and such sand is deposited by gravity on the surface of the road in an even and uniform broad band extending the full width of the tread of the truck.

Now it will be observed, particularly from Figure 6, that the axis of the roll 26 is back of the discharge opening 25, or at least is to the rear portion of this discharge opening 25. Thus the sand is loaded into the pocket presented to the opening 25, and such presentation occurs only forwardly of a vertical line passing through the axis of the roll 26. This arrangement accomplishes two purposes. The drum is not loaded with sand until the pocket has passed the vertical center line, it being understood that the roll 26 in Figure 6 is rotating in clock-wise direction; in other words the pockets at the upper portion thereof are moving toward the right or in the same direction as the forward direction of movement of the truck carrying the device. Thus the weight of sand received in the pocket 27 beneath the opening 25 will tend to rotate the roll 26 because of the weight thereof. This tendency is increased by the inclination of the baffle 24 which guides the sand down into substantially tangential contact with the peripheral pocketed portion of the roll 26. Therefore, both as a matter of weight and as a matter of movement of the sand into the pockets, such sand will have the effect to facilitate, rather than to retard, the rotary movement of the roll 26.

One of the principal objects of the invention is to reduce the friction and grinding effect of the sand upon the distributing roll so that the power of the engine of the motor truck may be used mainly in hauling the load. I have, therefore, reduced the frictional or grinding effect of the sand on the distributing roll to a minimum by directing the sand mass forward of the axis of the distributing roll by means of either the fixed or vibrating baffle plate. Therefore, the improved auxiliary sanding device requires very little power to operate the entire mechanism. I thus do away with a requirement for an auxiliary motor or power plant for driving the sanding device. Such auxiliary power plant increases the initial cost and cost of maintenance and takes up space and adds load. Moreover it involves difficulties in starting, particularly in sub-zero temperatures where a device of this character is largely needed.

This device is designed to be operated by the driver of the truck and no other operator whatsoever will be required. The arrangement also permits the carrying of a very heavy load of sand at a relatively rapid rate over the road with the continuous spreading of a wide sheet of the sand uniformly throughout the entire distance travelled. The sand sheet delivered by the distributing roll over the surface of the ground or road will ordinarily be approximately 8 feet wide to accord substantially with the tread of modern trucks. In this way a great area of the road surface may be sanded in a minimum space of time which is very important to eliminate the hazard of ice and snow immediately after precipitation.

The quantum of the sand delivered to the roadway may be regulated in a number of different ways. First of all by the speed of the truck; in the second place by the gear ratio of the sprockets 50 and 52; the gear ratio of the sprockets 45 and 47; and the adjustment of the gate. If the gate is moved down to a full closed position no sand will be permitted to escape forwardly through the front discharge opening 28, but the sand delivered to the roadway will only be that passing down through the bottom discharge opening 25 and delivered to the pockets of the distributing roll 26. The sand contained in such pockets of course passes beneath the lower edges of the fingers 30. However, should greater quantities of sand be needed the gate may be elevated to the desired extent by operation of the adjusting screw shafts 31. This creates a gap between the outer surface of the distributing roll 26 and the lower edges of the spring fingers 30 whereby to open up a portion of the front discharge opening 28. The sand is constantly directed toward this front discharge opening 28 by the inclination of the baffle plate 24, and in cases where the vibratory baffle plate 24ª is employed, this tendency of the sand mass in the receptacle to move forward as well as downward is emphasized. Consequently, the sand is directed to the front discharge opening 28 and will flow freely therethrough over the outer circumference of the distributing roll 26 and thence downward by gravity upon the ground or road surface. Therefore, in addition to the sand delivered by the base discharge opening 25 to the pockets 27 of the rotary distributing roll 26, there is supplied to the road surface a free flowing continuous sheet of sand through the open portion of the front discharge opening 28. In this way the delivery of a continuous relatively wide sheet of sand to a desired depth is insured to icy and snow covered roads, the depth of the sheet or carpet of sand being under nice regulation by the action of the screw shafts 31 in the vertical adjustment of the gate. Spring fingers 30 are provided rather than a transversely continuous gate for the reason that the spring fingers 30 will yield and spring forward whenever stones, or large obstructions carried with the sand force themselves down into the pockets of the distributing roll or tend to jam the outlet of the front discharge opening 28. The rotary action of the distributing roll 26 will assist to drive these abnormally large and foreign particles and substances through the discharge openings and past the spring fingers 30 which will yield rather than result in jamming of the device. When the truck is to be restored to its original condition, the device may be readily removed by simply lifting the bin out of the truck body and unfastening the bolts 69 which hold the receptacle beneath the truck beams. A plate may then be placed over the discharge openings 17 in the truck body.

While the device has been described more particularly in connection with the use of sand, it will be understood that it will also be useful in the deposit of loam, commercial fertilizer and other substances particularly on the fairways and greens of golf courses. Whenever in the claims the invention is referred to as a sanding device, all obvious other uses are included.

It is obvious that various changes and modifications may be made in the details of construction and design of the above specifically described embodiment of this invention without departing from the spirit thereof, such changes and modifications being restricted only by the scope of the following claims:

What is claimed is:

1. A sanding device comprising a hopper provided with inclined bottom walls terminating at a substantially central point relative to the hopper, a pair of spaced apart dependent discharge tubes carried by said bottom walls, a horizontally disposed receptacle positioned below said tubes, tubes secured to said receptacle telescoping said first tubes, a conveyor shaft journalled in said receptacle, said shaft including oppositely pitched spiral portions terminating at the inner ends thereof below said tubes whereby to convey the sand in opposite directions from the center of said hopper, a sand distributing member rotatably supported below said conveyor shaft and including a fluted surface portion providing pockets for the sand, said receptacle having an outlet port in the forward wall thereof extending upwardly of said distributing member, a yieldable baffle carried by said receptacle extending downwardly from said conveyor shaft and inclined in the direction of said outlet port, said baffle having the lower edge thereof contacting with the surface of said distributing member whereby the fluted surface portion of said distributing member will agitate said baffle to thereby effect movement of the sand in the direction of said outlet port, a gate for said outlet port, supporting means for said gate, and means for vertically adjusting said gate to control the quantity of sand passing through said outlet port.

2. A road sander comprising a sand reservoir, a receptacle beneath said reservoir, means connecting said reservoir and receptacle to conduct sand therebetween, conveying means in the receptacle for distributing sand throughout the length of the receptacle, a roller having in its outer surface a plurality of grooves extending axially of the roller, means for rotatably mounting said roller below said conveying means, a movable baffle extending partly between said conveying means and said roller and having a free edge contacting said roller whereby on rotation of the roller the baffle is vibrated by the free edge dropping successively into the grooves to deliver a constant small quantity of sand into the grooves, and a gate comprising a row of flexible fingers positioned with the free ends of the fingers adjacent the roller forwardly of the baffle in the direction of rotation of the roller whereby to restrict the quantity of sand delivered from said roller to the road.

DANIEL B. DIMICK.